United States Patent
De Araujo et al.

(10) Patent No.: US 7,813,447 B2
(45) Date of Patent: Oct. 12, 2010

(54) APPARATUS, SYSTEM, AND METHOD FOR DYNAMIC PHASE EQUALIZATION IN A COMMUNICATION CHANNEL

(75) Inventors: Daniel N. De Araujo, Cedar Park, TX (US); Moises Cases, Austin, TX (US); Bradley D. Herrman, Cary, NC (US); Erdem Matoglu, Austin, TX (US); Bhyrav M. Mutnury, Austin, TX (US); Pravin S. Patel, Cary, NC (US); Nam H. Pham, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 11/560,257

(22) Filed: Nov. 15, 2006

(65) Prior Publication Data

US 2008/0112503 A1    May 15, 2008

(51) Int. Cl.
*H04L 25/03* (2006.01)
(52) U.S. Cl. ............... 375/296; 375/146; 375/147; 375/229; 375/284; 375/316
(58) Field of Classification Search ............ 375/296, 375/146, 147, 229, 232, 316
See application file for complete search history.

(56) References Cited

U.S. PATENT DOCUMENTS

| | | | | |
|---|---|---|---|---|
| 6,262,606 B1 * | 7/2001 | Tamjidi | ............... | 327/108 |
| 6,279,158 B1 | 8/2001 | Geile et al. | ............... | 725/126 |
| 6,662,367 B2 | 12/2003 | Dapper et al. | ............... | 725/105 |
| 6,785,446 B1 | 8/2004 | Chandrasekhar et al. | ...... | 385/39 |
| 6,944,206 B1 | 9/2005 | Dent | ............... | 375/144 |
| 7,051,127 B2 * | 5/2006 | Molgaard et al. | ............ | 710/100 |

OTHER PUBLICATIONS

"On the Correspondency between TCP Acknowledgment Packet and Data Packet," Guohan, L. et al., IMC c2003.
"Improved Design Methodology for High-Speed High-Accuracy Current Steering D/A Converters," Miquel Albiol et al., IEEE Computer Society c2003.
"A 6.4-Gb/s CMOS SerDes core with feed-forward and decision-feedback equalization" Beukema, T. et al., IEEE Journal of Solid-State Circuits, vol. 40, No. 12, pp. 2633-2645, Dec. 2005.
Atif Zafar, A simple error classification system for understanding sources of error in automatic speech recognition and human transcription, International Journal of Medical Informatics, 2004, pp. 719-730.

(Continued)

*Primary Examiner*—Shuwang Liu
*Assistant Examiner*—Dhaval Patel
(74) *Attorney, Agent, or Firm*—Kunzler Needham Massey & Thorpe (57) ABSTRACT

An apparatus, system, and method are disclosed for dynamic phase equalization in a communication channel. A transmitter history module stores a plurality of bits from a data stream that is transmitted through the communication channel. A transmitter detection module detects a pre-transition bit of a first value that is preceded in the data stream by at least one bit of the first value and followed by a transition bit with a second value. A driver module transmits the data stream by driving the communication channel. A transition module pre-drives the communication channel to the second voltage of the transition bit during a bit time interval of the pre-transition bit.

17 Claims, 5 Drawing Sheets

OTHER PUBLICATIONS

Tanthawichian, Bandwidth Allocation in ATM Networks: Hueristic Approach, Graduate School of Information Sciences, Tohoku University, 1998, pp. 20-25.

Licia Capra, Mobile Computing Middleware for Context-Aware Applications, Dept. of Computer Science, University College London, 2002, p. 723-724.

Malcolm Colton, Replicated Data in a Distributed Environment, Sybase, Inc., 1993 p. 227-228.

John D. Sweeney, Scalability and Schedulability in Large,Coordinated, Distributed Systems, Laboratory for Perceptual Robotics, Department of Computer Science, University of Massachusetts, 2003, pp. 4074-4079.

Richard Freeman, Self-Organizing Maps for Hierarchical Tree View Document Clustering Using Contextual Information, UMIST, Department of Electrical Engineering and Electronics, 2002, pp. 123-128.

* cited by examiner

APPARATUS, SYSTEM, AND METHOD FOR DYNAMIC PHASE EQUALIZATION IN A COMMUNICATION CHANNEL

BACKGROUND OF THE INVENTION

1. Field of the Invention

This invention relates to phase equalization and more particularly relates to dynamic phase equalization in a communication channel.

2. Description of the Related Art

Electronic devices such as computers, communication devices, and the like, are transmitting data through communication channels at ever-higher rates. The demand for higher transmission rates is driven by increasing processing speeds that require data at higher rates and by an increasing volume of data that is transmitted both by organizations and by individuals.

Communication channels typically include a conductor. A transmitter drives an electrical signal encoding the data through the conductor to a receiver. The data may be recovered from the electrical signal received by the receiver. The data may be digitally encoded as binary values such as one (1) and zero (0). The transmitter may drive the conductor to a first voltage for a one (1) and a second voltage for a zero (0).

Electrical signaling speed is bounded by noise and loss in the communication channel. Although the noise in the communication channel may be contained by careful design, inherent electromagnetic properties of conductors such as skin effect, dielectric loss, and surface roughness loss reduce the electrical signal causing distortion and difficulty in recovering the transmitted data.

Some of the noise may be characterized as deterministic jitter. Deterministic jitter may be noise caused by the transition between the first and second voltages. The transition may introduce high frequency elements in the electronic signal. The high frequency elements may cause a voltage level to fluctuate. Data may be difficult to recover from the received electrical signal until the high frequency elements damp out.

SUMMARY OF THE INVENTION

In accordance with the foregoing discussion, there is a need for an apparatus, system, and method that dynamically equalize a communication channel. Beneficially, such an apparatus, system, and method would mitigate high frequency elements of an electrical signal transmitted through the communication channel that make data difficult to recover.

The present invention has been developed in response to the present state of the art, and in particular, in response to the problems and needs in the art that have not yet been fully solved by currently available dynamic equalization methods. Accordingly, the present invention has been developed to provide an apparatus, system, and method for dynamic phase equalization that overcome many or all of the above-discussed shortcomings in the art.

The apparatus for dynamic phase equalization is provided with a plurality of modules configured to functionally execute the steps of storing bits of a data stream, detecting a pre-transition bit, transmitting the data stream through a communication channel, and pre-driving the communication channel during a bit time interval of the pre-transition bit. These modules in the described embodiments include a transmitter history module, a transmitter detection module, a driver module, and a transition module.

The transmitter history module stores a plurality of bits from the data stream that is transmitted through the communication channel. The transmitter detection module detects a pre-transition bit of a first value that is preceded in the data stream by at least one bit of the first value and followed by a transition bit with a second value.

The driver module transmits the data stream by driving the communication channel with a drive signal at a first voltage for the bit time interval in response to a bit with the first value and driving the communication channel with the drive signal at a second voltage for the bit time interval in response to a bit of the second value. The transition module pre-drives the communication channel to the second voltage of the transition bit during the bit time interval of the pre-transition bit.

The apparatus dynamically equalizes the communication channel by pre-driving selected voltage transitions. A system of the present invention is also presented for dynamic phase equalization. The system may be embodied in a communication device. In particular, the system, in one embodiment, includes a communication channel, a transmitter, and a receiver. The transmitter includes a transmitter history module, a transmitter detection module, a driver module, and a transition module.

The communication channel is in electrical communication with the transmitter and the receiver. The transmitter may communicate a plurality of bits of a data stream through the communication channel to the receiver.

The transmitter history module stores a plurality of bits from the data stream that is transmitted through the communication channel. The transmitter detection module detects a pre-transition bit of a first value that is preceded in the data stream by at least one bit of the first value and followed by a transition bit with a second value.

The driver module transmits the data stream by driving the communication channel with a drive signal at a first voltage for the bit time interval in response to a bit with the first value and driving the communication channel with the drive signal at a second voltage for the bit time interval in response to a bit of the second value. The transition module pre-drives the communication channel to the second voltage of the transition bit during the bit time interval of the pre-transition bit. The receiver receives a plurality of received bits of the data stream from the communication channel. By pre-driving the second voltage for the transition bit, the system dynamically equalizes the communication channel allowing the data of the transition bit to be more easily recovered.

A method of the present invention is also presented for dynamic phase equalization. The method in the disclosed embodiments substantially includes the steps to carry out the functions presented above with respect to the operation of the described apparatus and system. In one embodiment, the method includes storing bits of a data stream, detecting a pre-transition bit, transmitting the data stream through a communication channel, and pre-driving the communication channel during a bit time interval of the pre-transition bit.

A transmitter history module stores a plurality of bits from the data stream that is transmitted through the communication channel. A transmitter detection module detects a pre-transition bit of a first value that is preceded in the data stream by at least one bit of the first value and followed by a transition bit with a second value.

A driver module transmits the data stream by driving the communication channel with a drive signal at a first voltage for the bit time interval in response to a bit with the first value and driving the communication channel with the drive signal at a second voltage for the bit time interval in response to a bit of the second value. A transition module pre-drives the communication channel to the second voltage of the transition bit during the bit time interval of the pre-transition bit. The method dynamically equalizes the communication channel by equalizing the high frequency elements of the transition to the transition bit.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention dynamically equalizes a communication channel by detecting a pre-transition bit and pre-driving the voltage of a transition bit during a bit time interval of the pre-transition bit. The present invention may support higher data transmission rates and reduce data recovery errors. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
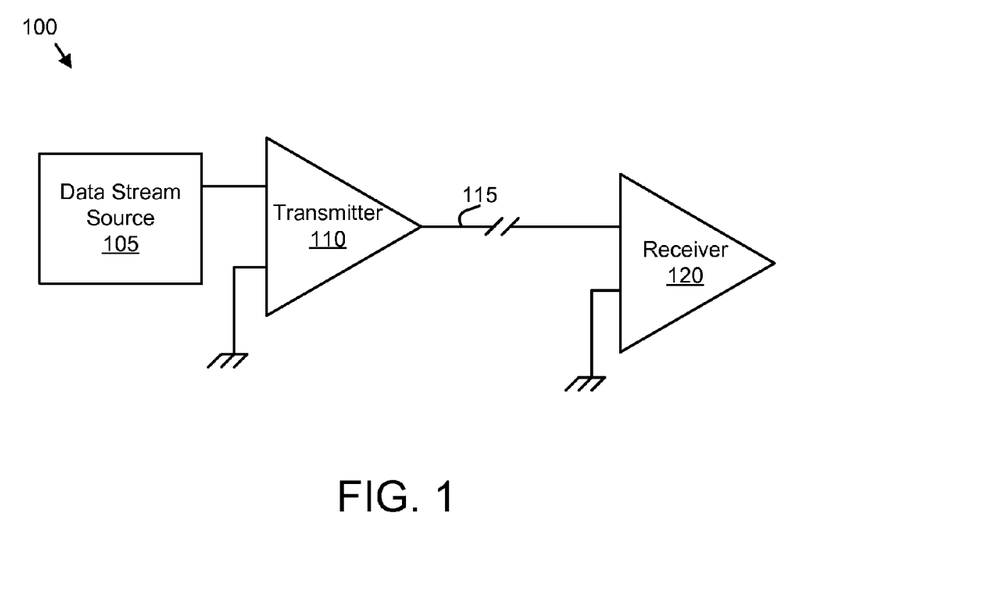
FIG. 1 is a schematic block diagram illustrating one embodiment of a communication device in accordance with the present invention.

FIG. 1 is a schematic block diagram illustrating one embodiment of a communication device 100 in accordance with the present invention. The device 100 includes a data stream source 105, a transmitter 110, a communication channel 115, and a receiver 120. In the depicted embodiment, the device 100 communicates data of a data stream from the data stream source 105 to the receiver 120.

The data stream source 105 may be a digital port, a digital bus, a processor, or the like. In one embodiment, the data stream source 105 produces a sequential series of binary bits. The binary bits may be encoded in the data stream as one or more voltages. A bit's encoded value as used herein refers to a specified voltage of the bit. For example, a binary one (1) may be encoded as three point three volts (3.3 V) while a binary zero (0) may be encoded as zero volts (0 V).

The transmitter 110 encodes the data stream for transmission over the communication channel 115 to the receiver 120. For example, the transmitter 110 may encode a binary one (1) as an electrical signal of one volt (1 V) while encoding a binary zero (0) as an electrical signal of zero volts (0 V). The receiver 120 receives the electrical signal and may decode the signal as a binary one (1) bit if the voltage of the electrical signal exceeds a first threshold such as zero point seven volts (0.7 V). Similarly, the receiver 120 may decode the signal as a binary zero (0) bit if the voltage of the electrical signal is less than a second threshold such as zero point three volts (0.3 V).

Figure 2:
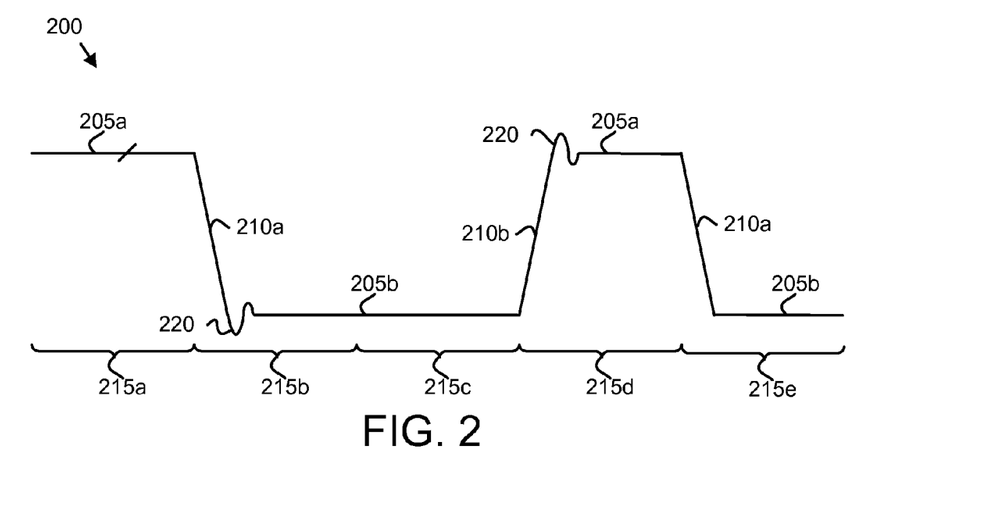
FIG. 2 is a waveform diagram illustrating one embodiment of an electrical signal.

FIG. 2 is a waveform diagram illustrating one embodiment of an electrical signal 200. The electrical signal 200 is representative of the data stream from the data stream source 105. The electrical signal 200 may also be representative of the output of the transmitter 110 without dynamic phase equalization. The description of the electrical signal 200 refers to elements of FIG. 1, like numbers referring to like elements.

The electrical signal 200 is divided into a plurality of bit time intervals 215. In one embodiment, the bit time intervals 215 are defined by an electronic clock as is well known to those of skill in the art. The electronic clock is referred to herein as a clock. The start of each bit time interval 215 corresponds to a transition of the clock.

The electrical signal 200 represents a bit value during each bit time interval 215. For example, the electrical signal 200 has a first voltage 205a during a first time interval 215a. During a second bit time interval 215b, the electrical signal 200 transitions 210a from the first voltage 205a to a second voltage 205b. The electrical signal 200 maintains the second voltage 205b through a third bit time interval 215c until transitioning 210b to the first voltage 205a in a fourth bit time interval 215d. The electronic signal 200 transitions 210a to the second voltage 205b in a fifth bit time interval 215e.

When the slew rate of the transitions 210 between voltages 205 is rapid, the electrical signal 200 includes high frequency elements that are expressed as deterministic jitter 220. Recovering data from the electrical signal 200 is difficult until the deterministic jitter 220 damps out. The present invention dynamically phase equalizes a drive signal to reduce the effect of the deterministic jitter 220 when recovering the data.

Figure 3:
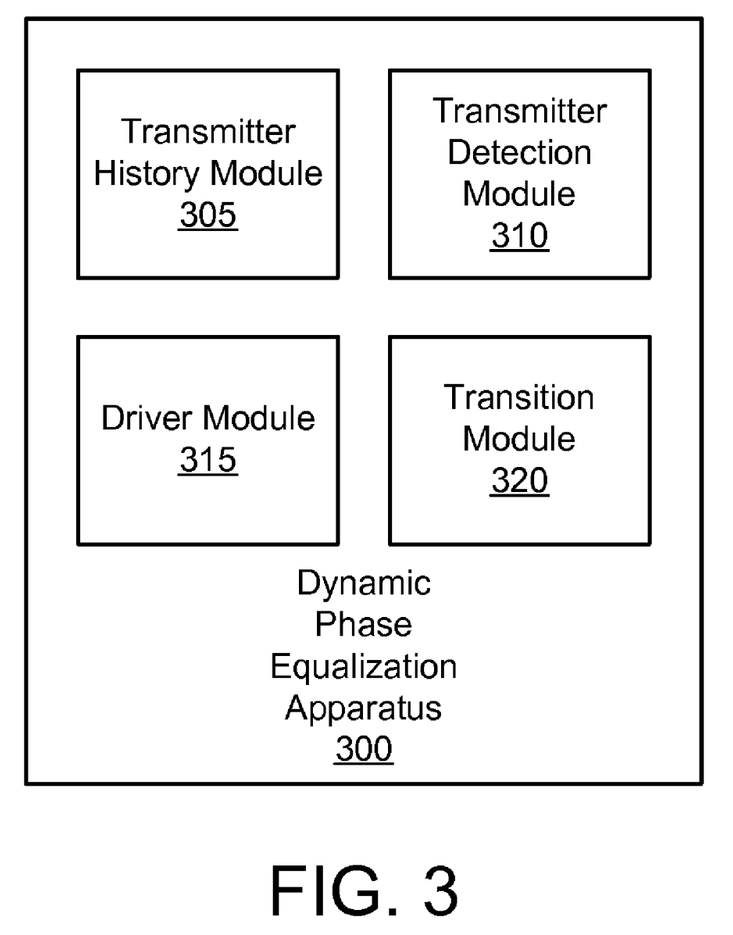
FIG. 3 is a schematic block diagram illustrating one embodiment of a dynamic phase equalization apparatus of the present invention.

FIG. 3 is a schematic block diagram illustrating one embodiment of a dynamic phase equalization apparatus 300 of the present invention. The apparatus 300 dynamically equalizes the output of the transmitter 110. The description of the apparatus 300 refers to elements of FIGS. 1-2, like numbers referring to like elements. The apparatus 300 includes a transmitter history module 305, a transmitter detection module 310, a driver module 315, and a transition module 320.

The transmitter history module 305 stores a plurality of bits from the data stream that is transmitted through the communication channel 115. For example, the transmitter history module 305 may store three (3) bits from the data stream. In one embodiment, the transmitter history module 305 may store the bits in a transmitter delay line as will be described hereafter.

The transmitter detection module 310 detects a pre-transition bit of a first value that is preceded in the data stream by at least one bit of the first value and followed by a transition bit with a second value. For example, FIG. 2 shows the electrical signal 200 at the second voltage 205b during the second and third bit time intervals 215b, 215c and transitioning 210b to the first voltage 205a during the fourth bit time interval 215d. Therefore the transmitter detection module 310 detects the bit of the third bit time interval 215c as a pre-transition bit. One of skill in the art will recognize that the first voltage 205a and second voltage 205b may be used interchangeably herein.

The driver module 315 transmits the data stream by driving the communication channel 115 with a drive signal at a first voltage 205a for the bit time interval 215 in response to a bit with the first value such as one (1). In addition, the driver module 315 drives the communication channel 115 with the drive signal at a second voltage 205b for the bit time interval 215 in response to a bit of the second value. The transmitter 110 may embody the driver module 315.

The transition module 320 pre-drives the communication channel 115 during the bit time interval 215 of the pre-transition bit as will be described hereafter. The apparatus 300 dynamically phase equalizes the communication channel 115 by pre-driving transitions 210 between voltages 205 during bit time interval 215 of the pre-transition bit.

Figure 4:
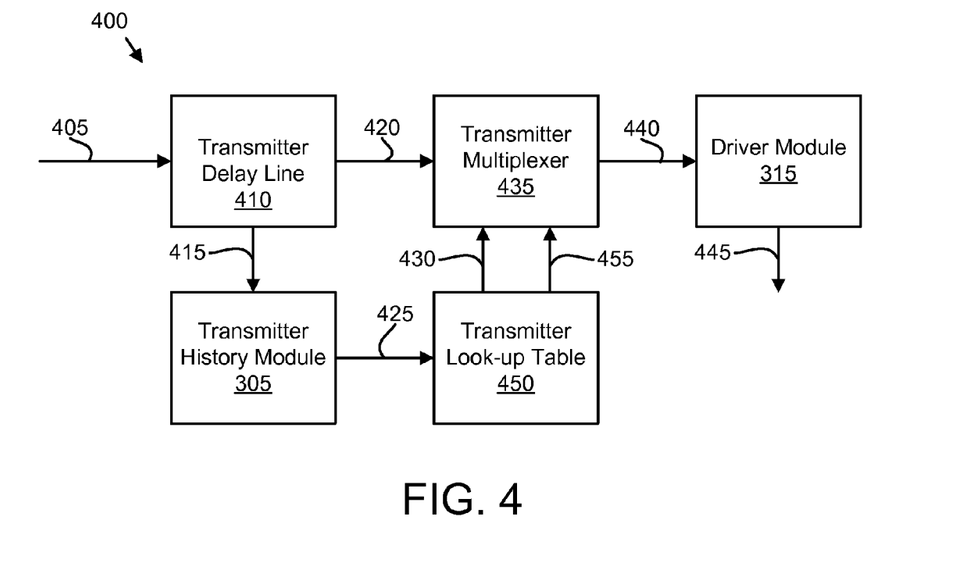
FIG. 4 is a schematic block diagram illustrating one embodiment of an equalizing transmitter of the present invention.

FIG. 4 is a schematic block diagram illustrating one embodiment of an equalizing transmitter 400 of the present invention. The description of the equalizing transmitter 400 refers to elements of FIGS. 1-3, like numbers referring to like elements. The equalizing transmitter 400 may embody the transmitter history module 305, transmitter detection module 310, driver module 315, and transition module 320 in the transmitter 110.

The transmitter history module 305 may comprise a transmitter delay line 410. The transmitter delay line 410 may receive a data stream input 405 comprising bits of the data stream. The transmitter delay line 410 stores one or more sequential bits from the data stream input 405. For example, the transmitter delay line 410 may store three sequential bits, $b_n$, $b_{n-1}$, and $b_{n-2}$, where the subscript refers to the numerical order of each bit b in the data stream sequence. When the transmitter delay line 410 subsequently receives another bit $b_{n+1}$, the transmitter delay line 410 may store the bits $b_{n+1}$, $b_n$, and $b_{n-1}$. In one embodiment, the transmitter delay line 410 includes a plurality of cascading registers as is well known to those of skill in the art. The cascading registers are referred to herein as transmitter cascading registers.

The transmitter delay line 410 may communicate one or more stored bits 415 to a transmitter history module 305. In one embodiment, the transmitter history module 305 stores each received stored bit 415 in other cascading registers that output a plurality of bits as transmitter history bits 425. Alternatively, the transmitter history module 305 outputs the stored bits 415 directly as transmitter history bits 425. The transmitter delay line 410 may also output a drive signal 420 to a transmitter multiplexer 435. The drive signal 420 may have the voltage 205 corresponding to a selected bit of the data stream.

The transition module 320 may include a transmitter look-up table 450. The transmitter look-up table 450 receives the transmitter history bits 425. The transmitter look-up table 450 may be configured as a memory such as static random access memory. The transmitter history bits 425 may drive the address inputs of the transmitter look-up table 450.

In one embodiment, the transmitter look-up table 450 outputs a pre-drive signal 430. The pre-drive signal 430 may be configured to pre-drive the communication channel 115 to the second voltage 205b for a pre-drive time interval during the bit time interval 215 of the pre-transition bit. The pre-drive time interval may end concurrently with an end of the bit time interval.

The pre-drive signal 430 may include one or more sub-bits wherein one or more initial sub-bits are encoded with the first voltage 205a and one or more subsequent sub-bits are encoded with the second voltage 205b. Each sub-bit may have a time interval that is an integer fraction of the bit time interval 215. The sub-bits may form the pre-drive signal 430 that will be described hereafter. In a certain embodiment, the transmitter look-up table 450 may output a pre-transition signal 455 that when asserted indicates that a bit of the data stream is a pre-transition bit.

In one embodiment, the transmitter multiplexer 435 receives the drive signal 420 and the pre-drive signal 430 and outputs either the drive signal 420 or the pre-drive signal 430 as a data stream signal 440. In one embodiment, the transmitter multiplexer 435 selects the pre-drive signal 430 if the pre-transition signal 455 is asserted.

In one embodiment, pre-drive time interval varies as a function of a number of bits of the first value that precede the pre-transition bit. For example, the pre-drive time interval may be longer if five (5) bits with a binary value of zero (0) precede the pre-transition bit than if six (6) bits with the binary value of zero (0) precede the pre-transition bit.

The data stream signal 440 drives the driver module 315. The driver module 315 may be configured as an amplifier as is well known to those of skill in the art. The driver module 315 may drive an equalized signal 445 over the communication channel 115.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
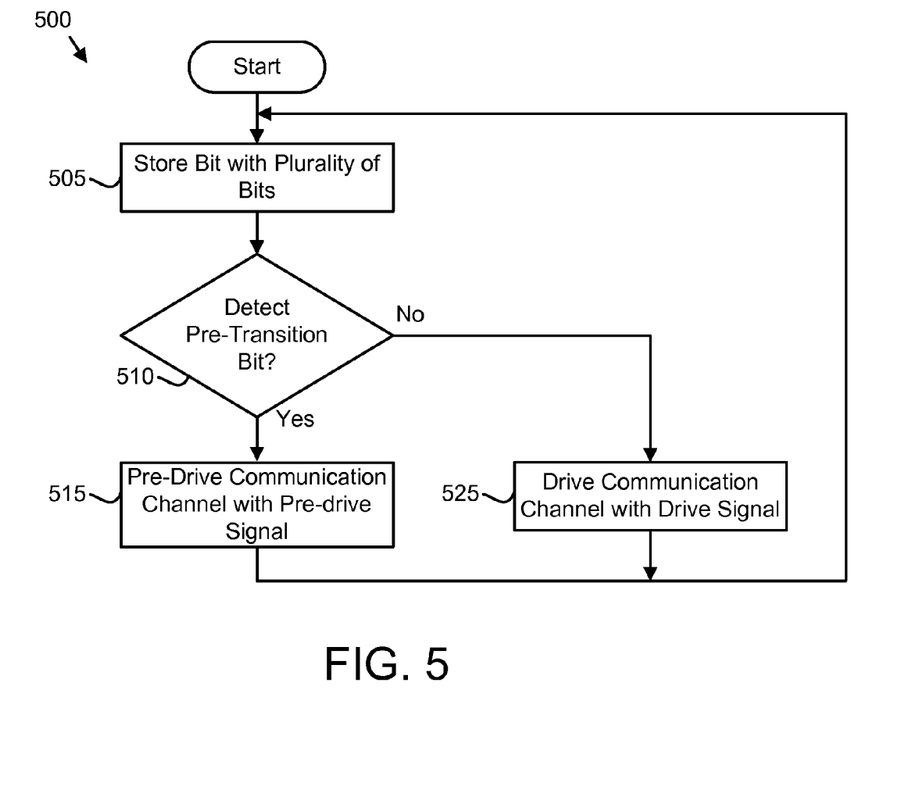
FIG. 5 is a schematic flow chart diagram illustrating one embodiment of a dynamic phase equalization method of the present invention.

FIG. 5 is a schematic flow chart diagram illustrating one embodiment of a dynamic phase equalization method 500 of the present invention. The method 500 substantially includes the steps to carry out the functions presented above with respect to the operation of the described apparatus and system of FIGS. 1-4. The description of the method 500 refers to elements of FIGS. 1-4, like numbers referring to like elements The transmitter history module 305 stores 505 a plurality of bits from the data stream input 405 of the data stream that is transmitted through the communication channel 115. In one embodiment, the transmitter history module 305 stores 505 the plurality of bits in registers that are cyclically addressed. For example, the transmitter history module 305 may store 505 a first bit in a first register, a second bit in a second register, and a third bit in a third register. The transmitter history module 305 may then store 505 a fourth bit in the first register and so on.

The transmitter detection module 310 detects 510 a pre-transition bit of a first value that is preceded in the data stream by at least one bit of the first value and followed by a transition bit with a second value. The transmitter detection module 310 may detect 510 the pre-transition bit from the bits stored by the transmitter history module 305.

If the transmitter detection module 305 does not detect 510 the pre-transition bit, the driver module 315 drives 525 the communication channel 115 with the drive signal 430 at a first voltage 205a for the bit time interval 215 in response to a bit with the first value such as one (1). In addition, the driver module 315 drives 525 the communication channel 115 with the drive signal 430 at a second voltage 205b for the bit time interval 215 in response to a bit of the second value. The method 500 further loops and the transmitter history module 305 stores 505 a plurality of bits.

If the transmitter detection module 305 detects 510 the pre-transition bit, the transition module 320 pre-drives 515 the communication channel 115 to the second voltage 205b of the transition bit during the bit time interval 215 of the pre-transition bit. The method 500 further loops and the transmitter history module 305 stores 505 a plurality of bits. The method 500 dynamically phase equalizes the communication channel 115 by pre-driving 515 transitions 210 between voltages 205 during the pre-transition bit.

Figure 6:
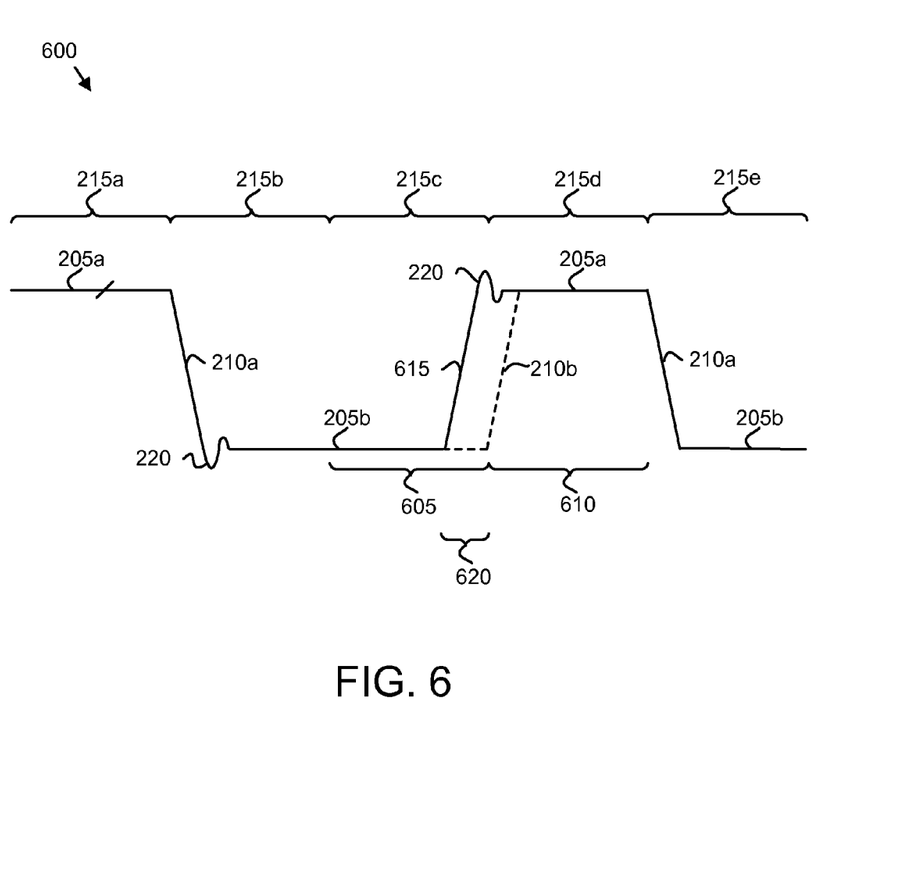
FIG. 6 is a waveform diagram illustrating one embodiment of an equalized electrical signal of the present invention.

FIG. 6 is a waveform diagram illustrating one embodiment of an equalized electrical signal 600 of the present invention. The description of the equalized electrical signal 600 refers to elements of FIGS. 1-5, like numbers referring to like elements. The equalized electrical signal 600 may be the equalized signal 445 of FIG. 4.

The equalized electrical signal 600 is the electrical signal 200 as equalized by the present invention. A pre-transition bit 605 is detected 610 by the transmitter detection module 310 before a transition bit 610. The transition module 305 pre-drives 615 the equalized electrical signal 600 through communication channel 115 to the voltage of the transition bit 610 during the bit time interval 215c of the pre-transition bit 605. In one embodiment, the transition module 305 pre-drives 615 the electrical signal 600 during a pre-drive time interval 620.

The pre-drive time interval 620 ends concurrently with an end of the bit time interval 215c for the pre-transition bit 605. In one embodiment, the pre-drive time interval is in the range of ten to seventy percent (10-70%) of the bit time interval 215c. In a certain embodiment, the pre-drive time interval 620 is in the range of forty to sixty percent (40-60%) of the bit time interval 215c. By pre-driving 615 a transition 615 to the voltage 205 of the transition bit 610, the deterministic jitter 220 may damp out before the transition bit 610 is recovered, equalizing the communication channel 115.

The embodiment of the present invention dynamically equalizes a communication channel 115 by detecting 610 a pre-transition bit 605 and pre-driving 615 the voltage of a transition bit 610 during a bit time interval 215 of the pre-transition bit 605. The present invention may support higher data transmission rates and reduce data recovery errors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for dynamic phase equalization, the apparatus comprising:
   a transmitter history module configured to store a plurality of bits from a data stream that is transmitted through a communication channel;
   a transmitter detection module configured to detect a pre-transition bit of a first value that is preceded in the data stream by at least one bit of the first value and followed by a transition bit with a second value;
   a driver module configured to transmit the data stream by driving the communication channel with a drive signal at a first voltage for a bit time interval in response to a bit with the first value and driving the communication channel with the drive signal at a second voltage for the bit time interval in response to a bit of the second value; and
   a transition module configured to pre-drive the communication channel to the second voltage of the transition bit for a pre-drive time interval during the bit time interval of the pre-transition bit, the pre-drive time interval ending concurrently with an end of the bit time interval, wherein the pre-drive time interval is in a range of ten to seventy percent of the bit time interval;
   wherein the transmitter history module, the transmitter detection module, the driver module, and the transition module comprise one or more of logic hardware and executable code, the executable code stored on a non-transitory computer readable medium.

2. The apparatus of claim 1, wherein the pre-drive time interval is in the range of forty to sixty percent of the bit time interval.

3. The apparatus of claim 1, wherein the transmitter history module comprises a transmitter delay line configured to store the plurality of bits in transmitter cascading registers.

4. The apparatus of claim 3, wherein the transmitter detection module comprises a transmitter look-up table that detects the pre-transition bit in response to the bits stored in the transmitter history module.

5. The apparatus of claim 4, wherein the transition module further comprises a multiplexer that selects between the drive signal and a pre-drive signal and the transition module pre-drives the communication channel by generating the pre-drive signal at the second voltage and selecting the pre-drive signal with the multiplexer.

6. The apparatus of claim 1, wherein the pre-drive time interval varies as a function of a number of bits of the first value that precede the pre-transition bit.

7. A non-transitory computer readable medium embodied a computer program having code executing to perform operations for dynamic phase equalization, the computer program comprising:
    storing a plurality of bits from a data stream that is transmitted through a communication channel;
    detecting a pre-transition bit of a first value that is preceded in the data stream by at least one bit of the first value and followed by a transition bit with a second value;
    transmitting the data stream by driving the communication channel with a drive signal at a first voltage for a bit time interval in response to a bit with the first value and driving the communication channel with the drive signal at a second voltage for the bit time interval in response to a bit of the second value; and
    pre-driving the communication channel at the second voltage of the transition bit for a pre-drive time interval during the bit time interval of the pre-transition bit, the pre-drive time interval ending concurrently with an end of the bit time interval, wherein the pre-drive time interval is in a range of ten to seventy percent of the bit time interval.

8. The method of claim 7, wherein the pre-drive time interval is in the range of forty to sixty percent of the bit time interval.

9. The method of claim 7, wherein the pre-drive time interval varies as a function of a number of bits of the first value that precede the pre-transition bit.

10. The method of claim 7, wherein the communication channel is pre-driven by generating a pre-drive signal at the second voltage and selecting the pre-drive signal from a multiplexer with inputs of the drive signal and the pre-drive signal.

11. The method of claim 7, wherein a look-up table detects the pre-transition bit.

12. A system for dynamic phase equalization, the system comprising:
    a communication channel;
    a transmitter in electrical communication with the communication channel and comprising
        a transmitter history module configured to store a plurality of bits from a data stream that is transmitted through the communication channel;
        a transmitter detection module configured to detect a pre-transition bit of a first value that is preceded in a data stream by at least one bit of the first value and followed by a transition bit with a second value;
        a driver module configured to transmit the data stream by driving the communication channel with a drive signal at a first voltage for a bit time interval in response to a bit with the first value and driving the communication channel with the drive signal at a second voltage for the bit time interval in response to a bit of the second value;
        a transition module configured to pre-drive the communication channel to the second voltage of the transition for a pre-drive time interval during the bit time interval of the pre-transition bit, the pre-drive time interval ending concurrently with an end of the bit time interval, wherein the pre-drive time interval is in a range of ten to seventy percent of the bit time interval; and
    a receiver in electrical communication with the communication channel and configured to receive a plurality of received bits of the data stream from the communication channel.

13. The system of claim 12, wherein the pre-drive time interval is in the range of forty to sixty percent of the bit time interval.

14. The system of claim 12, wherein the pre-drive time interval varies as a function of a number of bits of the first value that precede the pre-transition bit.

15. The system of claim 12, wherein the transmitter history module comprises a transmitter delay line configured to store the plurality of bits in transmitter cascading registers.

16. The system of claim 15, wherein the transmitter detection module comprises a transmitter look-up table that detects the pre-transition bit in response to the bits stored in the transmitter history module.

17. The system of claim 16, wherein the transition module further comprises a multiplexer that selects between the drive signal and a pre-drive signal and the transition module pre-drives the communication channel by generating the pre-drive signal at the second voltage and selecting the pre-drive signal with the multiplexer.

* * * * *